United States Patent [19]

Nielsen

[11] Patent Number: 4,527,810
[45] Date of Patent: Jul. 9, 1985

[54] ELEVATOR SUSPENSION SYSTEM

[76] Inventor: Keith H. Nielsen, 266 Dianna Dr., Littleton, Colo. 80124

[21] Appl. No.: 428,180

[22] Filed: Sep. 29, 1982

[51] Int. Cl.³ .................................................. B60P 1/00
[52] U.S. Cl. ...................................... 280/43.23; 280/704
[58] Field of Search .................. 280/43.23, 43.11, 704, 280/708, 711, 43.17, 43.18, 43.24; 414/495

[56] References Cited

U.S. PATENT DOCUMENTS

| | | | |
|---|---|---|---|
| 2,621,942 | 12/1952 | Getz | 280/43.23 |
| 3,042,392 | 7/1962 | Schmitz et al. | 280/708 |
| 3,246,781 | 4/1966 | Ballamy | 280/43.23 |
| 3,271,042 | 9/1966 | Flodin | 280/43.23 |
| 3,866,935 | 2/1975 | Nelson | 280/43.23 |
| 4,120,513 | 10/1978 | Hurt | 280/43.23 |
| 4,300,787 | 11/1981 | Vandenberg | 280/43.23 |
| 4,315,631 | 2/1982 | Rainville | 280/43.23 |

FOREIGN PATENT DOCUMENTS 609372  9/1960  Italy ................................ 280/43.23

*Primary Examiner*—David M. Mitchell
*Attorney, Agent, or Firm*—Kyle W. Rost

[57] ABSTRACT

A vehicle is provided with an in-line suspension and elevation system that interchangably performs both functions in accordance with the degree of air load placed in an air-adjustable shock absorber. The in-line aspect of the system provides that both the shock absorber and the vehicle running gear operate substantially in a single longitudinal plane and are disposed on a single face of a bellcrank mechanism that is pivoted to the vehicle chassis on an axis that is transverse to the longitudinal plane. Consequently, the chassis may include an unusually wide cargo carrying member or the like without such member being interrupted by housings for suspension system components. The elevation function operates with an air load in the shock absorber of from zero to the minimum load required to extend the shock absorber to a desired effective length. At the air load of full desired extension, the suspension system is automatically sprung to the chassis load that has been elevated.

5 Claims, 6 Drawing Figures

ELEVATOR SUSPENSION SYSTEM

BACKGROUND OF THE INVENTION

1. Field of the Invention

The invention relates to land vehicles and especially to wheeled land vehicles of the extensible type wherein the wheels are vertically adjustable and the load surface is below the wheel axis, and also to wheeled land vehicles of the extensible type wherein the wheels are vertically adjustable and are power operated. The invention also relates to material or article handling and specifically to self-loading or unloading vehicles having an elevating load body.

2. Description of the Prior Art

Trailers are often used for moving small loads, such as by towing the load behind an automobile. Large loads such as construction machinery of all sizes are also moved on trailers, usually pulled by trucks. Some trailers are designed for use with a specific piece of equipment, but in general, a trailer is not specifically adapted to haul only one item. Thus, because load sizes and weights may vary considerably, a trailer may be subjected to a wide range of loading on its suspension, with the minimum being zero loading above the weight of the trailer itself, and the maximum being the limit set by the physical strength of the trailer structure and the discretion of the operator. At times, therefore, a trailer may be underloaded, with the suspension being overly stiff for the carried load, with the result that the load tends to be harshly bounced. At other times, the trailer may be overloaded, with the result that the suspension exhausts its free movement and cannot absorb an adequate range of shocks. In either case, the load may be damaged by shock, and the trailer itself may suffer damage. Accordingly, it would be desirable to have a utility trailer suspension that is readily adjustable to the load weight so that the load and the trailer are both protected from shock damage.

Conventional trailer design employs an axle across the trailer platform, which determines the height of the trailer bed. Heavy equipment is often difficult to load onto a trailer unless special equipment is available, such as a ramp or winch, since the equipment must be raised to the trailer bed. This problem is most prevalent in the consumer trailer market, in which the trailer may be rented or owned by an individual for family use, since cost and size limitations may result in winches and ramps being unavailable or overly costly. Accordingly, it would be desirable to have an elevating load body on a trailer, wherein the load body could be elevated by equipment that operates in the normal suspension of the trailer, thereby eliminating the cost of extra, single purpose equipment. Correspondingly, it would be desirable to create a suspension system that, through the use of a unitary array of components operating in an integrated manner, could both provide elevator action to the trailer body and tailor the suspension system characteristics to the load weight.

Elevator action has been known for use in trailers and other equipment, such as plows. Elevator systems have employed a bellcrank having the traditional three pivots—one at the end of each of the bellcrank arms and one at the apex. One of the pilots is attached to a frame member, a second member is attached to a wheel axle, and a third is attached to a hydraulic cylinder or the like. In operation, the hydraulic cylinder serves as the prime mover for pivoting the bellcrank on the frame-attached pivot, causing relative vertical movement of the wheel axle and thus, producing elevator action. The bellcrank has been inoperative with regard to suspension system operation, and in some cases the bellcrank has even been locked into position by a fastener to prevent movement when elevator action is not desired. United States patents showing this state of the art are U.S. Pat. Nos. 3,666,129 to Haskins; 3,533,641 to Driskill; 3,240,506 to McMullen; 3,217,911 to McMullen; and 2,712,277 to Rutter.

The present invention provides an integrated elevation and adjustable suspension system that resolves the problems of the prior art as described above.

SUMMARY OF THE INVENTION

An integrated elevation and selectively adjustable suspension system for a vehicle having a running gear and chassis employs a crank arm having three pivot points, one being near each of two opposite ends of the arm and the third being intermediate the end pivots. In combination with the crank arm, an air-adjustable shock absorber is employed. A suitable means is provided for pivotally connecting a first end of the air-adjustable shock absorber to one of the three pivot points of the crank arm, and another suitable means is provided for connecting the second, opposite end of the air-adjustable shock absorber to the vehicle chassis. Another suitable means connects one of the two remaining crank arm pivot points to the vehicle chassis at a location offset from the connection of the air-adjustable shock absorber to the chassis such that changes in the effective length of the shock absorber result in relative pivotal motion between the crank arm and the chassis about the pivot point of the crank arm to the chassis. Another suitable means connects a vehicle running gear to the third crank arm pivot point for supporting the running gear on the crank arm and permitting relative selective positioning of the running gear with respect to the chassis in response to the relative pivotal position of the crank arm to the chassis at the pivot point of the crank arm to the chassis. Finally, an air load adjusting means is provided for selectively controlling the extension and damping characteristics of the shock absorber.

A vehicle employing the suspension and elevation system may carry the crank arm on the intermediate pivot point on a vehicle axle that may be a stub shaft carried on a side of the chassis, and therefore, the axle may be at the plane of the chassis bottom or thereabove, permitting the chassis bottom to be fully lowered when the elevator is in its lowered position. In addition, the chassis may include a cargo carrying member of unusual width with respect to the vehicle running gear width, while avoiding the necessity for suspension system housings or indentations in the chassis sides. This uninterrupted chassis configuration is made possible by the in-line disposition of the shock absorber and running gear, both being on a single side of the crank arm; and large diameter tires may be used since under-chassis clearance is not an inhibition. Variations in vehicle load capacity are made possible by the addition of a plurality of air-adjustable shock absorbers on a single crank arm and by the addition of plural suspension systems to a single chassis or to a single side of a chassis.

The suspension and elevation system operates in an integrated manner, differentiating between its functions in accordance with the amount of air charge in the shock absorber. When the air charge is zero or nearly so, the shock absorber is collapsed and the elevator function is operable to bring the vehicle chassis to its lowered position. With increasing air charge, the effective length of the shock absorber increases, raising the chassis toward maximum height. At full effective length, the shock absorber has raised the chassis fully and matched springing to the vehicle load, including off-center loads, as each side of the vehicle suspension may be independently charged to accommodate lateral weight distribution. Because the desired air charge for purposes of a matched suspension system is also the minimum air charge that will fully elevate the vehicle chassis and its cargo load, it can be readily seen that the integration of the functions is important to the best operation of the system.

DESCRIPTION OF THE PREFERRED EMBODIMENTS

The invention may be embodied in a number of forms, some consisting of a suspension system that might be added to a vehicle of choice, and others consisting of an entire vehicle with the system fully installed. The exact nature of the vehicle is also variable and may be a trailer, a boat, or an aircraft, although the system is thought to be primarily adapted for use on land vehicles. For purposes of explanation, the invention will be described as applied to a trailer, since this is presently the best use envisioned.

Figure 1:
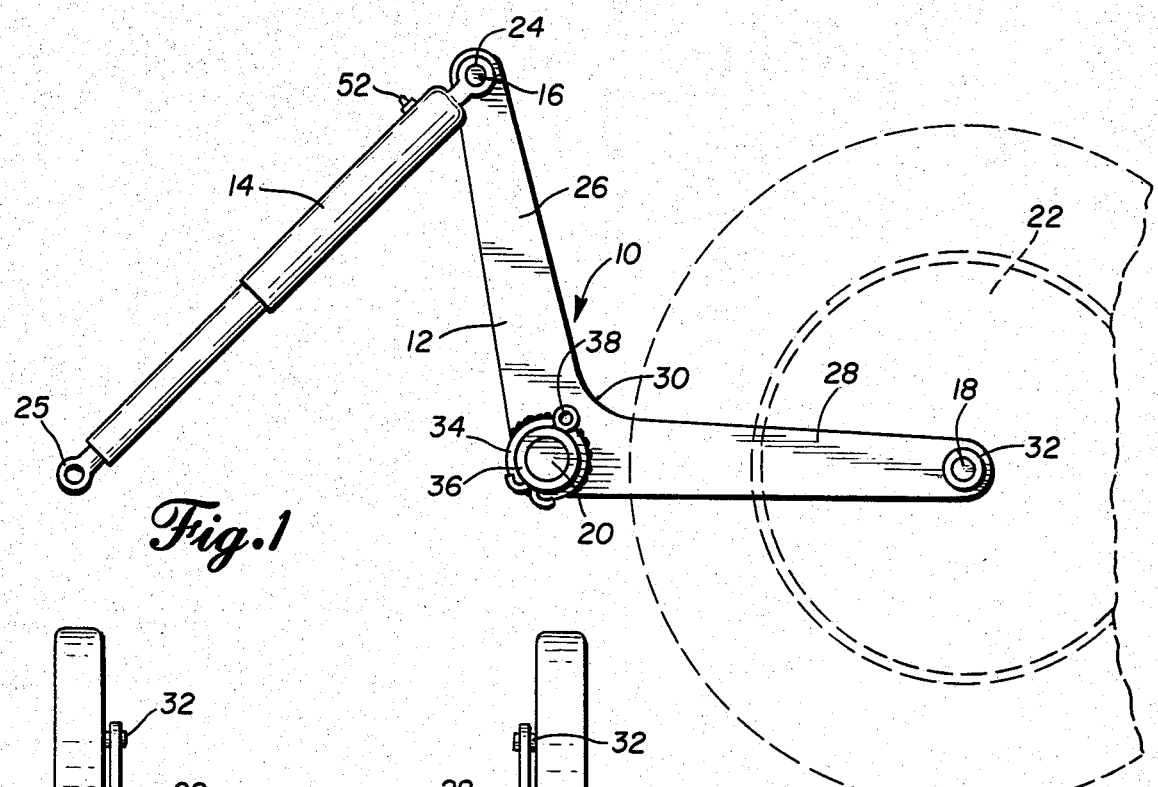
FIG. 1 is a side elevational view of the suspension and elevation system, with a vehicle running gear shown in phantom.

With reference to FIG. 1, the elevation and selectively adjustable suspension system 10 is shown as an isolated system that employs a crank arm 12 in combination with an air-adjustable shock absorber 14. The crank arm is provided with three points for attachment, each being designated as a pivot point. Pivot points 16 and 18 are at or near opposite ends of the crank arm, while pivot point 20 is intermediate the end points. The air-adjustable shock absorber 14 is attached at one of its ends to one of the pivot points, such as to pivot point 16. The crank arm is attachable to the vehicle at a second pivot point, such as at pivot point 20. The vehice running gear of whatever form is suitable, in this case shown to be a wheel 22, is attached to the third pivot point 18. The drawing illustrates the connection between the crank arm and the vehicle to be the central connection 20, and this is the preferred arrangement, although other arrangements could be used to achieve the same functional result with respect to the elevation and adjustable suspension features of the system.

The air-adjustable shock absorber 14 may be of the commercial variety that is available for automotive use, at least in the embodiment intended for use on a trailer. A first means for pivotally connecting a first end of the shock absorber to a pivot point of the crank arm connects the upper end of the shock absorber to pivot point 16. The first means may constitute a bolt or axle 24. A second means is provided for mounting the second or lower end of the shock absorber to the vehicle chassis. The second means may also be a bolt or axle 25, FIGS. 2 and 3. An air-adjustable shock absorber offers a key feature to the system, in that when air pressure is sufficiently reduced, the shock absorber contracts against the forces applied against its ends and its effective length is reduced. When air is selectively applied to the shock absorber, its effective length is capable of increasing until the shock absorber reaches a maximum length against an applied load. Thereafter, further application of air increases the stiffness of the shock absorbing action but does not increase effective length. Although ordinarily an air-adjustable shock absorber is used in combination with a spring system, no such spring system is desired in the present system. Rather, in the present application of the air shock absorber, springing is adjusted to the trailer load by means of applying air to the shock absorber in a gradual fashion until the shock absorber achieves but does not substantially exceed a predetermined degree of extension within the range of maximum extension of the shock absorber which may be one-hundred percent. Thus, the desired degree of air charge is that which will extend the shock absorber without substantially exceeding the amount of air needed at the minimum for this purpose. The shock absorber thus serves as both the prime mover of the elevator system and as the load-matched springing system for the trailer.

Crank arm 12 is preferred to have the shape of a bellcrank having two arms 26, 28 joined at an apex 30 at an angle of ninety degrees or more. Pivot point 16 is near the outer end of arm 26, while pivot point 20 is approximately at the apex 30. Wheel 22 is mounted for rotation about pivot point 18, which is near the outer end of arm 28. In this described embodiment, each pivot point has an axis of rotation passing through it, with each of the axes being mutually parallel and being normal to the plane of crank arm movement as defined by the pivot axis through point 20.

Pivot point 18 on arm 28 may constitute a wheel spindle 32 of the known type adapted to carry bearings and an automobile tire and wheel assembly. Other types of running gear could be attached to the crank arm, depending upon the character of the vehicle with which the suspension system is used. The running gear could alternatively be an aircraft wheel and tire assembly, a pontoon, a ski, or a skid. Any such alternative running gear may include braces, struts, and the like associated hardware.

Figure 2:
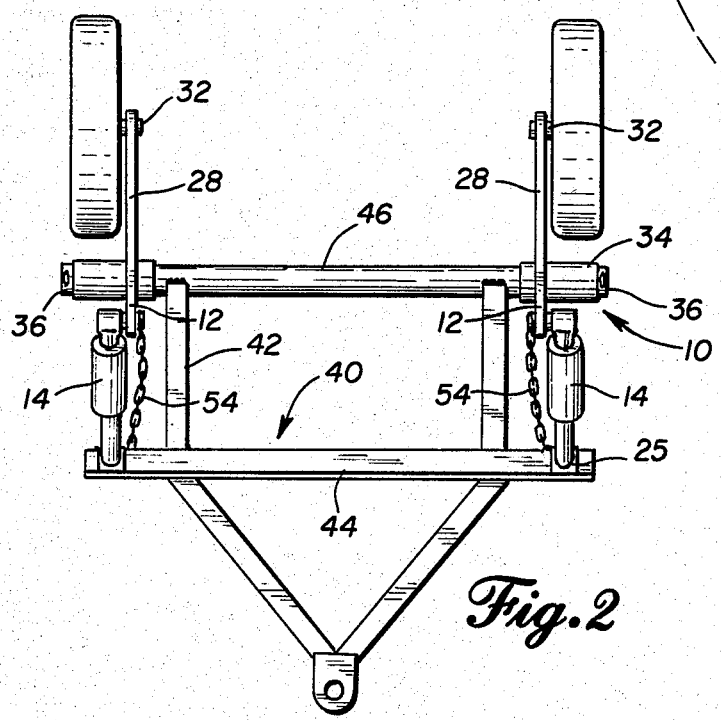
FIG. 2 is a top plan view of a trailer chassis having the suspension and elevation system installed in a basic embodiment.

With reference to FIGS. 1 and 2, the manner of attaching the suspension system to the vehicle is shown to be remarkably simple and streamlined and is specifically adapted to provide a low cost and durable hinge for use with a towed trailer. The crank arm 12 carries a segment of seamless tubing 34 that serves as the hub of the pivot at pivot point 20. The axle upon which this hub rides may be formed from a further segment of seamless tubing 36 that fits closely within the hub. A cotter pin 38 or like fastener may secure the hub on the axle. With particular reference to FIG. 2, it is shown that the wheel and tire assembly, the hub, and the air-adjustable shock absorber are all located on the outer face of the crank arm on either side of the trailer chassis 40. The suspension system thus has an in-line orientation with the longitudinal dimension of the vehicle and is characterized by the almost total absence of protruding components from the inside face of the crank arm. As a result, when this suspension system is used on a trailer, the trailer body may be wider than would be possible with a conventional suspension, while not requiring an indentation in the trailer sides to accommodate portions of the suspension system.

A trailer structure that employs the system 10 may be constructed from conventional longitudinal frame members 42 and lateral frame members 44, of which one may be a full length axle 46 upon which the hubs 34 are sized to ride. However, the axle 46 is optional, as the axle member 36 may be a stub shaft that is carried on a mounting plate. Thus, the suspension system 10 may be mounted to the sides of a suitably strong trailer box in a position where the axis through pivot point 20 will be in the plane of the box bottom or above it, while still permitting the box to be free of suspension system housings or intrusions. Likewise, the lower end of the air-adjustable shock absorber 14 may be connected to a frame member or to the side of the trailer box. The connection of the shock absorber and the crank arm to the trailer will generally be referred to as being to the chassis of the vehicle, and such reference includes connection to a frame member, to a portion of the vehicle wall, or to any other structure of the vehicle that is suitable to support the suspension.

Figure 3:
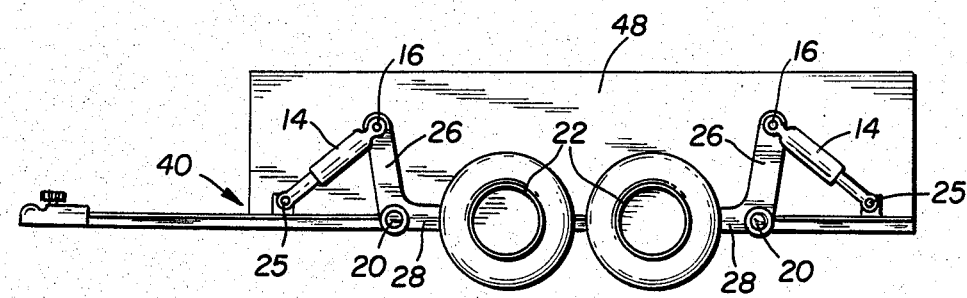
FIG. 3 is a side elevational view of a trailer chassis having a first modified embodiment of the suspension and elevation system installed.

A variety of trailer structures may be employed with the described suspension system. FIG. 2 shows a basic structure having a single wheel on each side of a frame and a single shock absorber in association with each wheel. A trailer of this design has a load range capacity of from zero to approximately nine hundred pounds. The configuration of FIG. 3 provides a cargo capacity of up to one ton and employs two suspension systems of the described configuration on each side of the trailer box 48, one of the systems being in reverse configuration. FIG. 3 also illustrates that crank arm 28 is supported in approximately horizontal position when the suspension system is supporting the trailer in its upward position. The lower attachment point 25 of the air-adjustable shock absorber 14 is offset from that attachment point 20 of the crank arm to the chassis such that changes in the effective length of the shock absorber will result in relative pivotal motion of the crank arm with respect to the chassis at point 20. If the crank arm portion 26 is approximately vertical, the shock absorber may be angled downwardly from point 16 and away from the running gear at approximately forty-five degrees, with the exact angle being determined in part by the relative lengths of the crank arm portion 26 and of the shock absorber in fully extended position.

Figure 5:
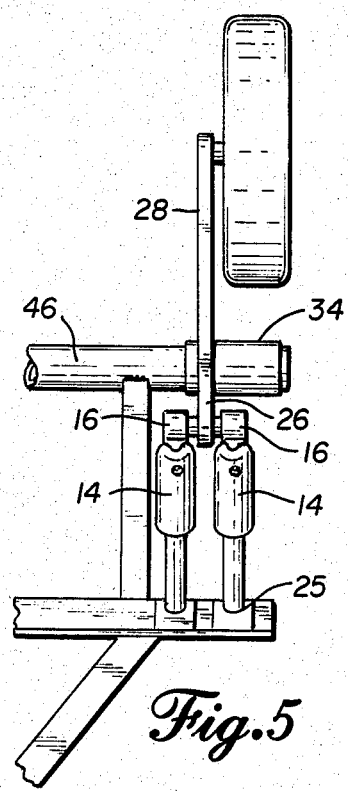
FIG. 5 is a fragmentary top plan view of a trailer chassis employing a second modified embodiment of the suspension and elevation system.
Figure 6:
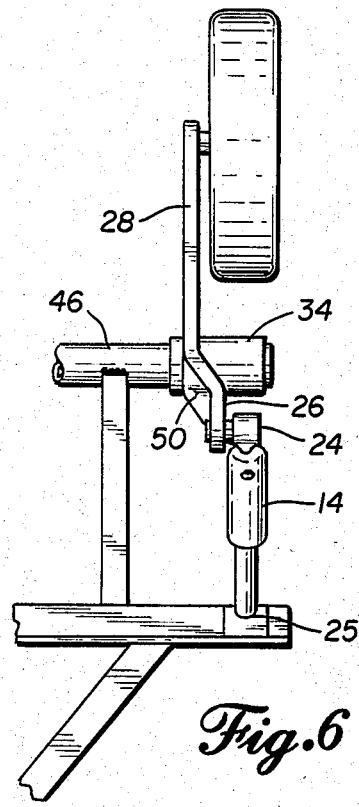
FIG. 6 is a view similar to FIG. 5, showing a third modified embodiment of the suspension and elevation system.

A further variation in the system configuration is shown in FIG. 5, wherein two air-adjustable shock absorbers 14 are connected between a single crank arm portion 26 and the vehicle chassis at point 25. FIG. 6 illustrates that crank arm portion 26 may be configured with a lateral offset 50 to better position the air-adjustable shock absorber 14 to have its center line in longitudinal alignment with the plane through the center of the wheel 22. An offset of greater degree may be used with the double shock absorber arrangement of FIG. 5 to position one of the two shock absorbers on either side of the wheel plane.

Each air-adjustable shock absorber is provided with an air valve 52 that permits the air charge in the shock absorber to be selectively increased or decreased. When the shock absorbers are installed in multiples on a vehicle, the air valves of two or more shock absorbers may be connected to a common air line for common control through a single valve. When the shock absorbers on opposite sides of the vehicle are not interconnected, each side may be charged to a different pressure in order to accommodate off-center loads.

A restraining means such as a cable or chain 54, FIG. 2, may be connected in parallel with each shock absorber to indicate full extension or to limit extension to a desired length. Other means such as indicia 55 may be marked on the shock absorbers or on the trailer body to indicate when the trailer is at the desired degree of elevation under the air charge that has been supplied to the shock absorbers.

Figure 4:
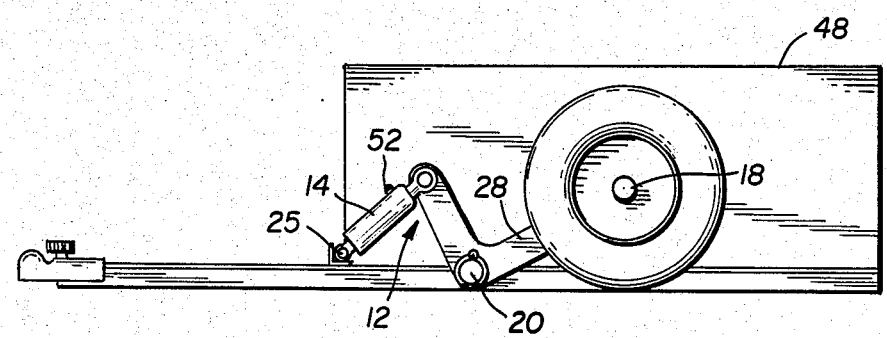
FIG. 4 is a side elevational view of the trailer chassis of FIG. 2, showing the chassis in lowered position.

The operation of the elevation and suspension system may be understood by reference to FIG. 4, When a load is to be placed in the trailer box 48, the box may be lowered to ground level by venting the air charge from the shock absorbers via the valve 52. The effective length of the shock absorber decreases as the air is vented, causing the crank arm 12 to pivot on point 20 under the force exerted by the trailer mass. Thus, point 20 drops with respect to point 18 until, at the maximum and with appropriate design, the bottom of the trailer box 48 or the trailer chassis 40 rests against the underlying surface. Loading is easily accomplished, such as by wheeling the load into the trailer box 48.

After the trailer has been loaded, the trailer is elevated by applying a source of pressurized air to the valve 52. A suitable source may include a hand or powered pump. The air charge entering the air-adjustable shock absorber increases the effective length of the shock absorber, causing the crank arm 12 to pivot on point 20, raising point 20 with respect to point 18. When the air-adjustable shock absorber has reached full desired extension under the air charge, as may be indicated by tautness of the restraining means, no further air is added. At this level of air charge, the air-adjustable shock absorber provides springing that is matched to the load. During travel with the trailer, impacts to the tire and wheel assembly are transmitted to pivot point 20 along the lever arm defined by crank arm portion 28, and the impacts are further transmitted to the air-adjustable shock absorber along the lever arm defined by crank arm portion 26. The lengths of these lever arms may be approximately equal. In one embodiment that has been found useful for utility trailer construction, arm 28 is fifteen inches in length, and arm 26 is fifteen inches in length. Each arm is formed from steel having one-half inch thickness. Hub 34 is nine inches in length and two and three-fourths inches in outer diameter. The hub is formed from tubing having three-sixteenths inch wall thickness.

The elevation and suspension system has been described in considerable detail for purposes of example. The scope of the invention is to be limited only by the prior art and the following claims:

I claim:

1. A vehicle having an integrated elevation and selectively adjustable suspension system, comprising:
a vehicle chassis;

a longitudinally disposad crank arm attached to said chassis for pivotal motion on a transverse axis, the crank arm having first and second arm portions disposed normally to said transverse axis and having a mounting means at the end of each arm remote from the transverse axis;

first and second air-adjustable shock absorbers connected transversely in parallel with respect to said longitudinal crank arm, having a first end connected to said vehicle chassis and at a second end connected to said mounting means on the end of the first crank arm portion, one of said shock absorbers being carried on each of the opposite transverse faces of the first crank arm portion, wherein the air-adjustable shock absorbers are of the type having a variable length and variable damping characteristics in response to variation in air load;

a vehicle running gear connected to said mounting means on the end of the second crank arm portion;

said first crank arm portion being transversely positioned with respect to the second crank arm portion to dispose the two air-adjustable shock absorbers in substantial symmetry with the plane of the longitudinal center line of the vehicle running gear; and means for selectively varying the air load of said air-adjustable shock absorbers to selectively alter their length to induce elevator action of the chassis with respect to the running gear and to selectively alter the air load of the shock absorbers for operation of the vehicle in elevated condition to alter their damping characteristics to the chassis load.

2. The vehicle of claim 1, wherein each of two opposite sides of the vehicle carries a separate crank arm, shock absorber pair, and vehicle running gear, and wherein said means for varying the air load of the air-adjustable shock absorbers comprises an independently operating means associated with each side of the vehicle for permitting adjustment of the damping characteristics to the lateral loading of the chassis.

3. The vehicle of claim 1, further comprising: a visual means for indicating a predetermined maximum extension of the shock absorbers on each side of the vehicle.

4. The vehicle of claim 3, wherein said extension indicating means comprises indicia marked on the surface of at least one of said shock absorbers.

5. The vehicle of claim 4, wherein said extension indicating means comprises a flexible elongated member attached between the opposite ends of a shock absorber and limiting extension thereof.

* * * * *